United States Patent
Kim et al.

(10) Patent No.: US 12,068,447 B2
(45) Date of Patent: Aug. 20, 2024

(54) LITHIUM SECONDARY BATTERY INCLUDING NON-AQUEOUS ELECTROLYTE SOLUTION

(71) Applicant: LG Energy Solution, Ltd., Seoul (KR)

(72) Inventors: Ha Eun Kim, Daejeon (KR); Young Min Lim, Daejeon (KR); Chul Haeng Lee, Daejeon (KR); Min Jung Kim, Daejeon (KR); Gwang Yeon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 13 days.

(21) Appl. No.: 17/876,628

(22) Filed: Jul. 29, 2022

(65) Prior Publication Data

US 2022/0367904 A1 Nov. 17, 2022

Related U.S. Application Data

(63) Continuation of application No. 15/740,065, filed as application No. PCT/KR2016/010997 on Sep. 30, 2016, now abandoned.

(30) Foreign Application Priority Data

Sep. 30, 2015 (KR) .................. 10-2015-0138029

(51) Int. Cl.
*H01M 10/052* (2010.01)
*H01M 4/50* (2010.01)
(Continued)

(52) U.S. Cl.
CPC ........... *H01M 10/052* (2013.01); *H01M 4/50* (2013.01); *H01M 4/52* (2013.01); *H01M 4/525* (2013.01);
(Continued)

(58) Field of Classification Search
CPC ........... H01M 10/052; H01M 10/0567; H01M 4/525; H01M 50/40; H01M 4/50; H01M 4/52; H01M 10/0569
See application file for complete search history.

(56) References Cited

U.S. PATENT DOCUMENTS

2005/0084765 A1 4/2005 Lee et al.
2006/0134521 A1* 6/2006 Shima .................. H01M 4/131
423/594.15
(Continued)

FOREIGN PATENT DOCUMENTS

CN 1311585 C 4/2007
CN 100492728 C 5/2009
(Continued)

OTHER PUBLICATIONS

International Search Report From PCT/KR2016/010997 dated Jan. 10, 2017.
(Continued)

*Primary Examiner* — Zhongqing Wei
(74) *Attorney, Agent, or Firm* — Lerner David LLP

(57) ABSTRACT

The present invention relates to a lithium secondary battery which includes a non-aqueous electrolyte solution including lithium bis(fluorosulfonyl)imide (LiFSI) and a fluorobiphenyl compound, a positive electrode including a lithium-nickel-manganese-cobalt-based oxide as a positive electrode active material, a negative electrode, and a separator.

8 Claims, 1 Drawing Sheet

(51) Int. Cl.
  *H01M 4/52*       (2010.01)
  *H01M 4/525*      (2010.01)
  *H01M 10/0567*    (2010.01)
  *H01M 10/0569*    (2010.01)
  *H01M 50/40*      (2021.01)
  *H01M 4/02*       (2006.01)
  *H01M 4/505*      (2010.01)
  *H01M 10/0568*    (2010.01)

(52) U.S. Cl.
  CPC ....... *H01M 10/0567* (2013.01); *H01M 50/40* (2021.01); *H01M 2004/027* (2013.01); *H01M 2004/028* (2013.01); *H01M 4/505* (2013.01); *H01M 10/0568* (2013.01); *H01M 10/0569* (2013.01); *H01M 2300/0034* (2013.01); *H01M 2300/0065* (2013.01)

(56) References Cited

U.S. PATENT DOCUMENTS

| | | | |
|---|---|---|---|
| 2006/0177742 | A1 | 8/2006 | Abe et al. |
| 2010/0310944 | A1 | 12/2010 | Kang et al. |
| 2012/0244425 | A1* | 9/2012 | Tokuda ............. H01M 10/0564 429/188 |
| 2013/0330609 | A1 | 12/2013 | Sawa et al. |
| 2014/0322576 | A1 | 10/2014 | Okumura et al. |
| 2015/0044578 | A1 | 2/2015 | Kourtakis et al. |
| 2016/0013517 | A1 | 1/2016 | Nakazawa et al. |
| 2016/0028127 | A1 | 1/2016 | Ahn et al. |

FOREIGN PATENT DOCUMENTS

| | | | |
|---|---|---|---|
| CN | 102484284 | A | 5/2012 |
| CN | 103636048 | A | 3/2014 |
| CN | 104798244 | A | 7/2015 |
| JP | 2003203673 | A | 7/2003 |
| JP | 2010507213 | A | 3/2010 |
| JP | 2010182688 | A | 8/2010 |
| JP | 2011096643 | A | 5/2011 |
| JP | 2012182130 | A | 9/2012 |
| JP | 2013161644 | A | 8/2013 |
| JP | 2013239375 | A | 11/2013 |
| JP | 2014192143 | A | 10/2014 |
| KR | 20080034393 | A | 4/2008 |
| KR | 20110126729 | A | 11/2011 |
| KR | 20120090969 | A | 8/2012 |
| KR | 20140040285 | A | 4/2014 |
| KR | 20140093976 | A | 7/2014 |
| WO | 2013128676 | A1 | 9/2013 |
| WO | 2014157591 | A1 | 10/2014 |

OTHER PUBLICATIONS

Chinese Search Report for Application No. 201680041020.0 dated Mar. 24, 2020, 2 pages.

* cited by examiner

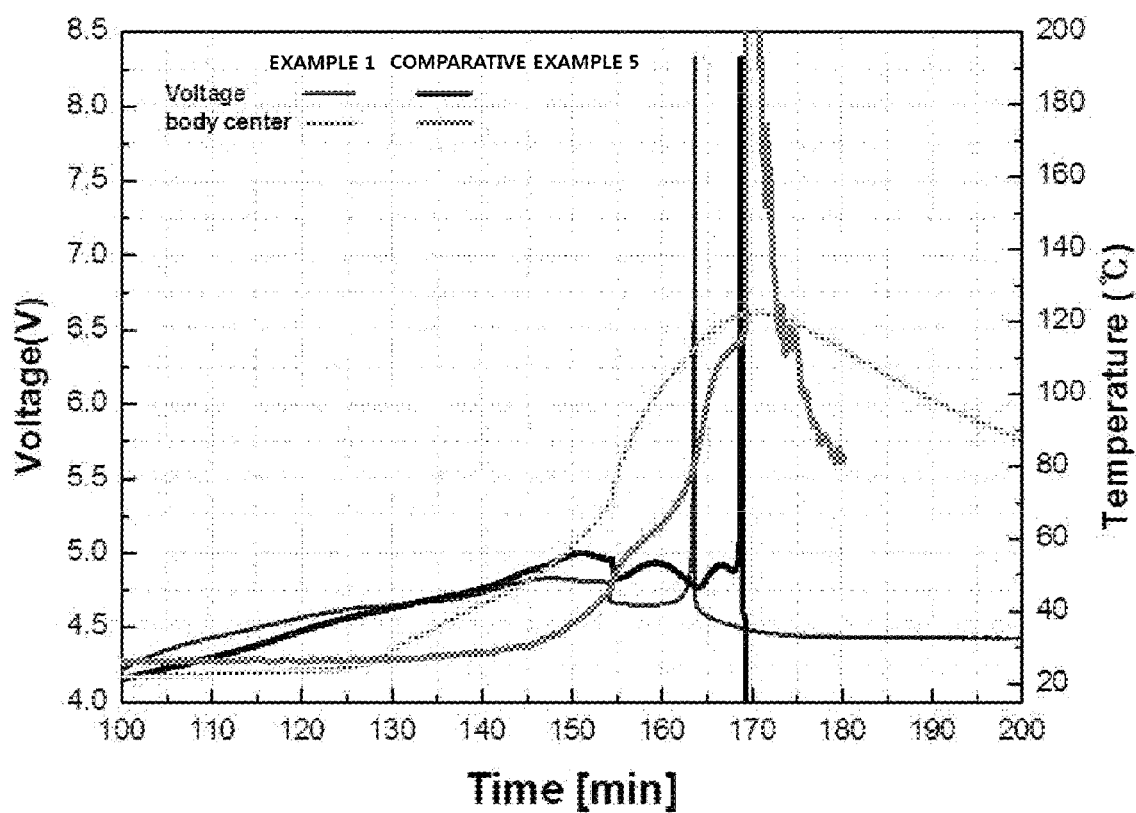

LITHIUM SECONDARY BATTERY INCLUDING NON-AQUEOUS ELECTROLYTE SOLUTION

CROSS-REFERENCE TO RELATED APPLICATIONS

The present application is a continuation of U.S. application Ser. No. 15/740,065, filed Dec. 27, 2017, which is a national phase entry under 35 U.S.C. § 371 of International Application No. PCT/KR2016/010997, filed Sep. 30, 2016 which claims priority to Korean Patent Application No. 10-2015-0138029, filed Sep. 30, 2015, the disclosures of which are incorporated herein by reference.

TECHNICAL FIELD

The present invention relates to a lithium secondary battery which includes a non-aqueous electrolyte solution including lithium bis(fluorosulfonyl)imide (LiFSI) and a fluorobiphenyl compound, a positive electrode including a lithium-nickel-manganese-cobalt-based oxide as a positive electrode active material, a negative electrode, and a separator.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a positive electrode active material of a lithium secondary battery, and a lithium metal, a lithium alloy, crystalline or amorphous carbon, or a carbon composite is used as a negative electrode active material. A current collector may be coated with the active material of appropriate thickness and length or the active material itself may be coated in the form of a film, and the resultant product is then wound or stacked with an insulating separator to prepare an electrode assembly. Thereafter, the electrode assembly is put into a can or a container similar thereto, and a secondary battery is then prepared by injecting an electrolyte solution.

Charge and discharge of the lithium secondary battery is performed while a process of intercalating and deintercalating lithium ions from a lithium metal oxide positive electrode into and out of a graphite negative electrode is repeated. In this case, since lithium is highly reactive, lithium reacts with the carbon electrode to form $Li_2CO_3$, LiO, or LiOH, and thus, a film may be formed on the surface of the negative electrode. The film is denoted as "solid electrolyte interface (SEI)", wherein the SEI formed at an initial stage of charging may prevent a reaction of the lithium ions with the carbon negative electrode or other materials during charge and discharge. Also, the SEI may only pass the lithium ions by acting as an ion tunnel. The ion tunnel may prevent the collapse of a structure of the carbon negative electrode due to the co-intercalation of the carbon negative electrode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the negative electrode of the lithium secondary battery. When the SEI is once formed during the first charge, the SEI may prevent the reaction of the lithium ions with the negative electrode or other materials during repeated charge and discharge cycles caused by the subsequent use of the battery, and the SEI may act as an ion tunnel that only passes the lithium ions between the electrolyte solution and the negative electrode.

Conventionally, with respect to an electrolyte solution which does not include an electrolyte solution additive or includes an electrolyte solution additive having poor characteristics, it may be difficult to expect the improvement of low-temperature output characteristics due to the formation of a non-uniform SEI. Furthermore, even in a case in which the electrolyte solution additive is included, if the amount of the added electrolyte solution additive is not adjusted to a required amount, the surface of a positive electrode may be decomposed or an oxidation reaction of the electrolyte solution may occur during a high-temperature reaction due to the electrolyte solution additive, and eventually, irreversible capacity of the secondary battery may be increased and output characteristics may be reduced. Also, since a decomposition reaction of the electrolyte solution occurs when the lithium secondary battery is stored at high temperature, high-temperature storage performance and life performance of the battery may be degraded.

DISCLOSURE OF THE INVENTION

Technical Problem

The present invention provides a non-aqueous electrolyte solution for a lithium secondary battery which may improve room-temperature and high-temperature cycle characteristics and capacity characteristics after high-temperature storage as well as low-temperature and room-temperature output characteristics, and a lithium secondary battery including the same.

Technical Solution

According to an aspect of the present invention, there is provided a lithium secondary battery including: a non-aqueous electrolyte solution including lithium bis(fluorosulfonyl)imide (LiFSI) and a fluorobiphenyl compound, a positive electrode including a lithium-nickel-manganese-cobalt-based oxide as a positive electrode active material, a negative electrode, and a separator.

Advantageous Effects

In a lithium secondary battery including a non-aqueous electrolyte solution for a lithium secondary battery of the present invention, since the non-aqueous electrolyte solution may form a robust solid electrolyte interface (SEI) on a negative electrode during initial charge and may prevent decomposition of the surface of a positive electrode and an oxidation reaction of the electrolyte solution during a high-temperature cycle, excellent low-temperature output characteristics as well as improved high-temperature storage characteristics and life characteristics may be achieved.

BRIEF DESCRIPTION OF THE DRAWINGS

FIG. 1 illustrates the results of overcharge tests on batteries of Example 1 and Comparative Example 5.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A lithium secondary battery of the present invention includes a non-aqueous electrolyte solution including lithium bis(fluorosulfonyl)imide (LiFSI) and a fluorobiphenyl compound, a positive electrode including a lithium-nickel-manganese-cobalt-based oxide as a positive electrode active material, a negative electrode, and a separator.

The non-aqueous electrolyte solution includes lithium bis(fluorosulfonyl)imide (LiFSI) and a fluorobiphenyl compound, and, since the lithium bis(fluorosulfonyl)imide is added as a lithium salt to the non-aqueous electrolyte solution to form a robust thin solid electrolyte interface (SEI) on the negative electrode, the lithium bis(fluorosulfonyl)imide may not only improve low-temperature output characteristics, but also may inhibit decomposition of the surface of the positive electrode, which may occur during a high-temperature cycle, and may prevent an oxidation reaction of the electrolyte solution. Since the fluorobiphenyl compound is added to the electrolyte solution and decomposed in the positive electrode and the negative electrode of the lithium secondary battery including the fluorobiphenyl compound to form a thin film and the thin film plays a role in protecting the positive electrode to reduce metal dissolution of the positive electrode active material and increase porosity of a negative electrode film, lithium ions may more smoothly move, and thus, long life and storage characteristics of the secondary battery including the fluorobiphenyl compound may be improved. Also, the fluorobiphenyl compound may improve room-temperature capacity characteristics and output characteristics, and, since the fluorobiphenyl compound may form a film near 4.62 V during overcharging to short the battery at a low state of charge (SOC), the fluorobiphenyl compound may prevent heat generation and subsequent ignition of the battery. Since the SEI formed on the negative electrode is thin, the lithium ions in the negative electrode may more smoothly move, and, accordingly, output of the secondary battery may be improved.

According to an embodiment of the present invention, a concentration of the lithium bis(fluorosulfonyl)imide in the non-aqueous electrolyte solution may be in a range of 0.01 mol/L to 2 mol/L, particularly, 0.01 mol/L to 1 mol/L. In a case in which the concentration of the lithium bis(fluorosulfonyl)imide is less than 0.01 mol/L, effects of improving the low-temperature output and high-temperature cycle characteristics of the lithium secondary battery may be insignificant. In a case in which the concentration of the lithium bis(fluorosulfonyl)imide is greater than 2 mol/L, since side reactions in the electrolyte solution may excessively occur during charge and discharge of the battery, a swelling phenomenon may occur and corrosion of a positive electrode or negative electrode collector formed of a metal may occur in the electrolyte solution.

In order to prevent the side reactions, the non-aqueous electrolyte solution of the present invention may further include a lithium salt excluding the lithium bis(fluorosulfonyl)imide. Any lithium salt commonly used in the art may be used as the lithium salt, and, for example, the lithium salt may include any one selected from the group consisting of LiPF$_6$, LiAsF$_6$, LiCF$_3$SO$_3$, LiBF$_6$, LiSbF$_6$, LiN(C$_2$F$_5$SO$_2$)$_2$, LiAlO$_4$, LiAlCl$_4$, LiSO$_3$CF$_3$ and LiClO$_4$, or a mixture of two or more thereof.

A mixing ratio of the lithium salt and the lithium bis(fluorosulfonyl)imide may be in a range of 1:0.01 to 1:1 as a molar ratio. In a case in which the mixing ratio of the lithium salt and the lithium bis(fluorosulfonyl)imide is above the molar ratio range, since the side reactions in the electrolyte solution may excessively occur during the charge and discharge of the battery, the swelling phenomenon may occur, and, in a case in which the mixing ratio is below the molar ratio range, the output of the secondary battery generated may be reduced. Specifically, in a case in which the mixing ratio of the lithium salt and the lithium bis(fluorosulfonyl)imide is less than 1:0.01 as a molar ratio, a large amount of irreversible reaction may occur during a process of forming the SEI in the lithium-ion battery and a process of intercalating lithium ions, which are solvated by a carbonate-based solvent, into the negative electrode, and the effects of improving the low-temperature output as well as the cycle characteristics and capacity characteristics after high-temperature storage of the secondary battery may be insignificant due to the exfoliation of a negative electrode surface layer (e.g., carbon surface layer) and the decomposition of the electrolyte solution. In a case in which the mixing ratio of the lithium salt and the lithium bis(fluorosulfonyl)imide is greater than 1:1 as a molar ratio, since an excessive amount of the lithium bis(fluorosulfonyl)imide is included in the electrolyte solution to cause the corrosion of the electrode collector during the charge and discharge, stability of the secondary battery may be affected.

The positive electrode active material, as the lithium-nickel-manganese-cobalt-based oxide, may include an oxide represented by Formula 1 below.

[Formula 1]

$$Li_{1+x}(Ni_aCo_bMn_c)O_2$$

where, 0.55≤a≤0.65, 0.18≤b≤0.22, 0.18≤c≤0.22, 0.2≤x≤0.2, and x+a+b+c=1.

Since the positive electrode active material, as the lithium-nickel-manganese-cobalt-based oxide, is used in the positive electrode, the positive electrode active material may be combined with the lithium bis(fluorosulfonyl)imide to have a synergistic effect. With respect to the lithium-nickel-manganese-cobalt-based oxide positive electrode active material, since a phenomenon (cation mixing), in which a position of Li$^{+1}$ ion and a position of Ni$^{+2}$ ion in a layered structure of the positive electrode active material are changed during the charge and discharge as an amount of nickel (Ni) among transition metals is increased, occurs, the structure is collapsed, and, thus, the positive electrode active material may cause a side reaction with the electrolyte solution or a dissolution phenomenon of the transition metal may occur. The reason for this is that sizes of the Li$^{+1}$ ion and the Ni$^{+2}$ ion are similar. Eventually, performance of the battery is easily degraded due to the depletion of the electrolyte solution in the secondary battery and the structural collapse of the positive electrode active material caused by the side reaction.

Therefore, since the LiFSI-containing electrolyte solution is used in the positive electrode active material of Formula 1 according to an embodiment of the present invention, a layer is formed of a component from the LiFSI on the surface of the positive electrode, and thus, a range, in which a sufficient amount of the Ni transition metal for securing capacity of the positive electrode active material may be secured while suppressing the cation mixing phenomenon of the Li$^{+1}$ ion and Ni$^{+2}$ ion, has been found. According to the positive electrode active material including the oxide according to Formula 1 of the present invention, the side reaction with the electrolyte solution and the metal dissolution phenomenon may be effectively suppressed when the LiFSI-containing electrolyte solution is used.

In particular, in a case in which a ratio of the Ni transition metal in the oxide represented by Formula 1 is greater than 0.65, since an excessive amount of the Ni is included in the positive electrode active material, the cation mixing phenomenon of the Li$^{+1}$ ion and Ni$^{+2}$ ion may not be suppressed even by the above-described layer generated from the LiFSI on the surface of the electrode.

Also, when the excessive amount of the Ni is included in the positive electrode active material, the nickel transition metal having a d orbital in an environment, such as high temperature, depending on the variation of oxidation number of the Ni must have an octahedral structure when coordination bonded, but the order of energy levels is reversed or the oxidation number is changed (heterogenization reaction) by external energy supply to form a distorted octahedron. As a result, since a crystal structure of the positive electrode active material including the nickel transition metal is transformed, the probability of dissolution of the nickel metal in the positive electrode active material is increased.

As a result, the present inventors found that excellent efficiency in high-temperature stability and capacity characteristics is achieved while generating high output when the positive electrode active material including the oxide in the range according to Formula 1 and the LiFSI salt are combined.

Although the high output and stability may be achieved when the positive electrode active material including the oxide of Formula 1 and the LiFSI lithium salt are combined, the electrolyte solution may be decomposed in a high output environment and collapse of the negative electrode may be induced. Thus, in a case in which the additives are combined and included in the non-aqueous electrolyte solution, high-temperature stability of the secondary battery generated may be secured.

In a case in which the lithium salt is LiPF$_6$, the electrolyte solution having insufficient thermal stability may be easily decomposed in the battery to form LiF and PF$_5$. In this case, the LiF salt may reduce conductivity and the number of free Li+ ions to increase the resistance of the battery, and, as a result, the capacity of the battery is reduced.

The non-aqueous electrolyte solution includes a non-aqueous organic solvent, and the non-aqueous organic solvent is not limited as long as it may minimize the decomposition due to the oxidation reaction during the charge and discharge of the battery and may exhibit desired characteristics with the additive. For example, the non-aqueous organic solvent may include a nitrile-based solvent, cyclic carbonate, linear carbonate, ester, ether, or ketone. These materials may be used alone or in combination of two or more thereof.

Among the above organic solvents, carbonate-based organic solvents may be easily used. Examples of the cyclic carbonate may be any one selected from the group consisting of ethylene carbonate (EC), propylene carbonate (PC), and butylene carbonate (BC), or a mixture of two or more thereof, and examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, and acetonitrile-based solvent may be used as the non-aqueous solvent according to an embodiment of the present invention.

Side effects due to the reduction of the stability of the high-output battery caused by the combination with the lithium bis(fluorosulfonyl)imide may be effectively prevented by using the acetonitrile-based solvent and using the lithium-nickel-manganese-cobalt-based oxide positive electrode active material in the positive electrode.

In an example of the present invention, the fluorobiphenyl compound may be a compound represented by the following Formula 2.

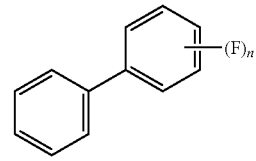

[Formula 2]

In Formula 2, n may be an integer of 1 to 5, and may specifically be 2.

In an example of the present invention, the fluorobiphenyl compound may be 2,3-difluorobiphenyl.

Since the non-aqueous electrolyte solution included in the lithium secondary battery of the present invention includes the fluorobiphenyl compound, the non-aqueous electrolyte solution may improve the room-temperature capacity characteristics and output characteristics and may prevent the heat generation and subsequent ignition of the battery by shorting the battery at a low SOC by forming a film near 4.62 V during overcharging.

An amount of the fluorobiphenyl compound may be in a range of 0.5 wt % to 10 wt %, particularly 1 wt % to 7 wt %, and more particularly 3 wt % to 5 wt %, based on a total weight of the non-aqueous electrolyte solution.

In a case in which the amount of the fluorobiphenyl compound is 0.5 wt % or more, an effect of shorting the battery during the overcharging of the battery as well as an appropriate effect of improving room-temperature capacity characteristics and output characteristics may be obtained, and, in a case in which the amount of the fluorobiphenyl compound is 10 wt % or less, problems, for example, an increase in irreversible capacity of the battery or an increase in resistance of the negative electrode, may be prevented while having a moderate effect.

The amount of the fluorobiphenyl compound may be adjusted according to the amount of the lithium bis(fluorosulfonyl)imide added, and, accordingly, the lithium bis(fluorosulfonyl)imide and the fluorobiphenyl compound may be used in a weight ratio of 1:0.02 to 1:10, particularly 1:0.03 to 1:9, and more particularly 1:0.05 to 1:7.5.

In a case in which the lithium bis(fluorosulfonyl)imide and the fluorobiphenyl compound is used in a weight ratio of 1:0.02 to 1:10, the fluorobiphenyl compound may appropriately suppress the side reaction in the electrolyte solution during the charge and discharge of the lithium secondary battery at room temperature which may occur due to the addition of the lithium bis(fluorosulfonyl)imide, and may solve a performance imbalance problem, for example, the reduction of the output in comparison to capacity retention after high-temperature storage or the reduction of the capacity retention in comparison to the output, or a problem such as a decrease in life characteristics improvement effect, when the mixing ratio is outside the above range.

The lithium secondary battery according to an embodiment of the present invention may include a negative electrode, a separator disposed between the positive electrode and the negative electrode, and the non-aqueous electrolyte solution. The positive electrode and the negative electrode may respectively include the positive electrode active material according to the embodiment of the present invention and a negative electrode active material.

Meanwhile, the negative electrode active material may include amorphous carbon or crystalline carbon, and, for example, carbon such as hard carbon and graphite-based carbon; a complex metal oxide such as $Li_xFe_2O_3$ ($0 \leq x \leq 1$), $Li_xWO_2$ ($0 \leq x \leq 1$), $Sn_xMe_{1-x}Me'_yO_z$ (Me=manganese (Mn), iron (Fe), lead (Pb), and germanium (Ge); Me'=aluminum (Al), boron (B), phosphorus (P), silicon (Si), Groups I, II and III elements, or halogen; $0 < x \leq 1$; $1 \leq y \leq 3$; $1 \leq z \leq 8$); a lithium metal; a lithium alloy; a silicon-based alloy; a tin-based alloy; an oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; a conductive polymer such as polyacetylene; or a Li—Co—Ni-based material may be used.

Also, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination of two or more thereof as the separator. In addition, a typical porous nonwoven fabric, for example, a nonwoven fabric formed of high melting point glass fibers or polyethylene terephthalate fibers may be used, but the present invention is not limited thereto.

The secondary battery may have various shapes, such as a cylindrical shape, a prismatic shape, or a pouch shape, depending on purposes, and is not limited to a configuration known in the art. The lithium secondary battery according to the embodiment of the present invention may be a pouch type secondary battery.

Hereinafter, the present invention will be described in more detail, according to examples and experimental examples. However, the present invention is not limited thereto.

EXAMPLES

Example 1

[Preparation of Electrolyte Solution]

A non-aqueous electrolyte solution was prepared by adding 0.9 mol/L of $LiPF_6$, as a lithium salt, based on a total amount of the non-aqueous electrolyte solution and adding 0.1 mol/L of lithium bis(fluorosulfonyl)imide and 3 wt % of 2,3-difluorobiphenyl to a non-aqueous organic solvent having a composition in which a volume ratio of ethylene carbonate (EC):ethylmethyl carbonate (EMC) was 3:7.

[Preparation of Lithium Secondary Battery]

A positive electrode mixture slurry was prepared by adding 92 wt % of $Li(Ni_{0.6}Co_{0.2}Mn_{0.2})O_2$ as a positive electrode active material, 4 wt % of carbon black as a conductive agent, and 4 wt % of polyvinylidene fluoride (PVdF) as a binder to N-methyl-2-pyrrolidone (NMP) as a solvent. An about 20 μm thick aluminum (Al) thin film as a positive electrode collector was coated with the positive electrode mixture slurry and dried, and the coated Al thin film was then roll-pressed to prepare a positive electrode.

Also, a negative electrode mixture slurry was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film as a negative electrode collector was coated with the negative electrode mixture slurry and dried, and the coated Cu thin film was then roll-pressed to prepare a negative electrode.

A polymer type battery was prepared by a typical method using a separator formed of three layers of polypropylene/polyethylene/polypropylene (PP/PE/PP) with the positive electrode and negative electrode thus prepared, and a lithium secondary battery was then completed by injecting the prepared non-aqueous electrolyte solution.

Example 2

A non-aqueous electrolyte solution and a lithium secondary battery were prepared in the same manner as in Example 1 except that 0.7 mol/L of $LiPF_6$ and 0.3 mol/L of lithium bis(fluorosulfonyl)imide were used.

Example 3

A non-aqueous electrolyte solution and a lithium secondary battery were prepared in the same manner as in Example 1 except that 0.5 mol/L of $LiPF_6$ and 0.5 mol/L of lithium bis(fluorosulfonyl)imide were used.

Example 4

A non-aqueous electrolyte solution and a lithium secondary battery were prepared in the same manner as in Example 2 except that 5 wt % of the 2,3-difluorobiphenyl was used.

Example 5

A non-aqueous electrolyte solution and a lithium secondary battery were prepared in the same manner as in Example 2 except that 10 wt % of the 2,3-difluorobiphenyl was used.

Example 6

A non-aqueous electrolyte solution and a lithium secondary battery were prepared in the same manner as in Example 2 except that 0.5 wt % of the 2,3-difluorobiphenyl was used.

Example 7

A non-aqueous electrolyte solution and a lithium secondary battery were prepared in the same manner as in Example 2 except that 2-fluorobiphenyl was used instead of the 2,3-difluorobiphenyl.

Comparative Example 1

A non-aqueous electrolyte solution and a lithium secondary battery were prepared in the same manner as in Example 2 except that $Li(Ni_{0.5}Co_{0.3}Mn_{0.2})O_2$ was used as the positive electrode active material.

Comparative Example 2

A non-aqueous electrolyte solution and a lithium secondary battery were prepared in the same manner as in Example 2 except that Li(Ni$_{0.8}$Co$_{0.1}$Mn$_{0.1}$)O$_2$ was used as the positive electrode active material.

Comparative Example 3

A non-aqueous electrolyte solution and a lithium secondary battery were prepared in the same manner as in Example 2 except that LiCoO$_2$ was used as the positive electrode active material.

Comparative Example 4

A non-aqueous electrolyte solution and a lithium secondary battery were prepared in the same manner as in Example 2 except that Li(Ni$_{0.5}$Co$_{0.3}$Mn$_{0.2}$)O$_2$ was used as the positive electrode active material and 2,3-difluorobiphenyl was not used.

Comparative Example 5

A non-aqueous electrolyte solution and a lithium secondary battery were prepared in the same manner as in Example 2 except that 2,3-difluorobiphenyl was not used.

Comparative Example 6

A non-aqueous electrolyte solution and a lithium secondary battery were prepared in the same manner as in Example 1 except that 0.3 mol/L of LiPF$_6$ and 0.7 mol/L of lithium bis(fluorosulfonyl)imide were used.

Experimental Example 1

<Capacity Characteristics after High-Temperature Storage>

The secondary batteries prepared in Examples 1 to 7 and Comparative Examples 1 to 6 were charged at 1 C to 4.2 V/38 mA under a constant current/constant voltage (CC/CV) condition and then discharged at a constant current (CC) of 2 C to a voltage of 2.5 V to measure discharge capacities. Next, after storing the secondary batteries prepared in Examples 1 to 7 and Comparative Examples 1 to 6 at 60° C. for 20 weeks, the secondary batteries were again charged at 1 C to 4.2 V/38 mA under a constant current/constant voltage (CC/CV) condition at room temperature and then discharged at a constant current (CC) of 2 C to a voltage of 2.5 V to measure discharge capacities. The discharge capacity after 20 weeks was calculated as a percentage based on the initial discharge capacity (discharge capacity after 20 weeks/initial discharge capacity×100(%)), and the results thereof are presented in Table 1 below.

Experimental Example 2

<Output Characteristics After High-Temperature Storage>

After storing the secondary batteries prepared in Examples 1 to 7 and Comparative Examples 1 to 6 at 60° C. for 20 weeks, outputs were calculated from voltage differences which were obtained by charging and discharging the secondary batteries at 5 C for 10 seconds at room temperature. The output after 20 weeks was calculated as a percentage based on the initial output (output (W) after 20 weeks/initial output (W)×100(%)), and the results thereof are presented in Table 1 below. The experiment was performed at a state of charge (SOC) of 50%.

TABLE 1

| | Positive electrode active material | LiPF$_6$:LiFSI dsd | Additive (wt %) | High-temperature storage characteristics (%) | |
|---|---|---|---|---|---|
| | | | | Capacity | Output |
| Example 1 | NMC622 | 9:1 | DFBP 3 | 93.9 | 95.3 |
| Example 2 | NMC622 | 7:3 | DFBP 3 | 95.4 | 97.7 |
| Example 3 | NMC622 | 5:5 | DFBP 3 | 92.6 | 94.1 |
| Example 4 | NMC622 | 7:3 | DFBP 5 | 92.4 | 93.3 |
| Example 5 | NMC622 | 7:3 | DFBP 10 | 90.3 | 91.1 |
| Example 6 | NMC622 | 7:3 | DFBP 0.5 | 91.1 | 92.6 |
| Example 7 | NMC622 | 7:3 | FBP 3 | 89.9 | 90.4 |
| Comparative Example 1 | NMC532 | 7:3 | DFBP 3 | 88.1 | 90.7 |
| Comparative Example 2 | NMC811 | 7:3 | DFBP 3 | 81.5 | 86.3 |
| Comparative Example 3 | LiCoO$_2$ | 7:3 | DFBP 3 | 90.7 | 91.4 |
| Comparative Example 4 | NMC532 | 7:3 | 0 | 87.7 | 88.9 |
| Comparative Example 5 | NMC622 | 7:3 | 0 | 90.4 | 92.1 |
| Comparative Example 6 | NMC622 | 3:7 | DFBP 3 | 87.6 | 89.9 |

In Table 1, NMC622 represents Li(Ni$_{0.6}$Co$_{0.2}$Mn$_{0.2}$)O$_2$, NMC532 represents Li(Ni$_{0.5}$Co$_{0.3}$Mn$_{0.2}$)O$_2$, NMC811 represents Li(Ni$_{0.8}$Co$_{0.1}$Mn$_{0.1}$)O$_2$, DFBP represents 2,3-difluorobiphenyl, and FBP represents 2-fluorobiphenyl.

As confirmed from Table 1, it may be understood that the lithium secondary batteries of Examples 1 to 7 exhibited high capacity and output even after the high-temperature storage by including the non-aqueous electrolyte solution which included both of the lithium bis(fluorosulfonyl)imide and the fluorobiphenyl compound. Among these lithium secondary batteries, the lithium secondary batteries of Examples 1 to 5 including 2,3-difluorobiphenyl, as the fluorobiphenyl compound, exhibited better high-temperature storage characteristics than the lithium secondary battery including 2-fluorobiphenyl as the fluorobiphenyl compound. Also, since the lithium secondary batteries of Examples 1 to 4 included the non-aqueous electrolyte solution including both of the lithium bis(fluorosulfonyl)imide and the fluorobiphenyl compound, the lithium secondary batteries of Examples 1 to 4 exhibited better high-temperature storage characteristics than the lithium secondary batteries of Comparative Examples 4 and 5 which did not include the fluorobiphenyl compound.

When comparing Example 2 with Comparative Examples 1 to 3, Example 2 including Li(Ni$_{0.6}$Co$_{0.2}$Mn$_{0.2}$)O$_2$ as the positive electrode active material exhibited better high-temperature storage characteristics than Comparative Examples 1 to 3 respectively including Li(Ni$_{0.5}$Co$_{0.3}$Mn$_{0.2}$)O$_2$, Li(Ni$_{0.8}$Co$_{0.1}$Mn$_{0.1}$)O$_2$, and LiCoO$_2$ as the positive electrode active material.

Also, when comparing Examples 1 to 3 with Comparative Example 6, in a case in which lithium-manganese-cobalt-based oxide, Li(Ni$_{0.6}$Co$_{0.2}$Mn$_{0.2}$)O$_2$, was included as the positive electrode active material, it may be confirmed that the high-temperature storage characteristics of the lithium secondary batteries were degraded when the amount of LiFSI was increased in comparison to that of LiPF$_6$.

Experimental Example 3

<Overcharge Evaluation>

The lithium secondary batteries prepared in Example 1 and Comparative Example 5 were overcharged to 8.3 V under a constant current/constant voltage (CC/CV) condition of 1 C (775 mAh)/12 V from a charged state at 25° C., changes in temperature and voltage of the battery at that time were measured, and the results thereof are presented in FIG. 1.

Referring to FIG. 1, it may be confirmed that the lithium secondary battery of Example 1, which included the non-aqueous electrolyte solution including the 2,3-difluorobiphenyl additive had a lower SOC at the time of short circuit caused by overcharge and a lower temperature at the center of the battery than the lithium secondary battery of Comparative Example 5 which did not include the 2,3-difluorobiphenyl additive.

The invention claimed is:

1. A lithium secondary battery comprising:
a non-aqueous electrolyte solution including lithium bis(fluorosulfonyl)imide (LiFSI), a lithium salt excluding the lithium bis(fluorosulfonyl)imide, and 2,3-difluorobiphenyl;
a positive electrode including a positive electrode active material consisting of a lithium-nickel-manganese-cobalt-based oxide represented by Formula 1:

$$Li_{1+x}(Ni_aCo_bMn_c)O_2 \qquad \text{Formula 1]}$$

wherein, in Formula 1, $0.55 \leq a \leq 0.65$, $0.18 \leq b \leq 0.22$, $0.18 \leq c \leq 0.22$, $-0.2 \leq x \leq 0.2$, and $x+a+b+c=1$;
a negative electrode; and
a separator, and
wherein the lithium bis(fluorosulfonyl)imide has a concentration of 0.01 mol/L to 2 mol/L in the non-aqueous electrolyte solution, and
the 2,3-difluorobiphenyl is included in an amount ranging from 3 wt % to 5 wt % based on a total weight of the non-aqueous electrolyte solution.

2. The lithium secondary battery of claim 1, wherein a mixing ratio of the lithium salt and the lithium bis(fluorosulfonyl)imide is in a range of 1:0.01 to 1:1 as a molar ratio.

3. The lithium secondary battery of claim 1, wherein the lithium salt excluding the lithium bis (fluorosulfonyl)imide comprises one selected from the group consisting of $LiPF_6$, $LiAsF_6$, $LiCF_3SO_3$, $LiN(CF_3SO_2)_2$, $LiBF_6$, $LiSbF_6$, $LiN(C_2F_5SO_2)_2$, $LiAlO_4$, $LiAlCl_4$, $LiSO_3CF_3$, and $LiClO_4$, or a mixture of two or more thereof.

4. The lithium secondary battery of claim 1, wherein the non-aqueous electrolyte solution contains a non-aqueous organic solvent, wherein the non-aqueous organic solvent comprises a nitrile-based solvent, linear carbonate, cyclic carbonate, ester, ether, ketone, or a combination thereof.

5. The lithium secondary battery of claim 4, wherein the cyclic carbonate comprises one selected from the group consisting of ethylene carbonate (EC), propylene carbonate (PC), and butylene carbonate (BC), or a mixture of two or more thereof, and
the linear carbonate comprises one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

6. The lithium secondary battery of claim 4, wherein the nitrile-based solvent comprises at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

7. The lithium secondary battery of claim 1, wherein the lithium bis(fluorosulfonyl)imide and the 2,3-difluorobiphenyl compound are included in a weight ratio of 1:0.02 to 1:10.

8. A lithium secondary battery comprising the non-aqueous electrolyte solution of claim 1.

* * * * *